(12) United States Patent
Buddhikot et al.

(10) Patent No.: US 8,140,845 B2
(45) Date of Patent: *Mar. 20, 2012

(54) SCHEME FOR AUTHENTICATION AND DYNAMIC KEY EXCHANGE

(75) Inventors: Milind M Buddhikot, Cliffwood, NJ (US); Juan A Garay, West New York, NY (US); Scott C Miller, Freehold, NJ (US); Luca Salgarelli, Hoboken, NJ (US)

(73) Assignee: Alcatel Lucent, Paris (FR)

( * ) Notice: Subject to any disclaimer, the term of this patent is extended or adjusted under 35 U.S.C. 154(b) by 1421 days.

This patent is subject to a terminal disclaimer.

(21) Appl. No.: 10/238,373

(22) Filed: Sep. 10, 2002

(65) Prior Publication Data

US 2003/0051140 A1    Mar. 13, 2003

Related U.S. Application Data

(60) Provisional application No. 60/318,736, filed on Sep. 13, 2001.

(51) Int. Cl.
| | |
|---|---|
| *H04K 1/00* | (2006.01) |
| *H04W 12/00* | (2009.01) |
| *H04W 12/02* | (2009.01) |
| *H04W 12/06* | (2009.01) |
| *H04W 12/08* | (2009.01) |

(52) U.S. Cl. ........................................ 713/168; 380/270
(58) Field of Classification Search ........................ 726/3
See application file for complete search history.

(56) References Cited

U.S. PATENT DOCUMENTS

| | | | | |
|---|---|---|---|---|
| 4,218,738 | A  * | 8/1980 | Matyas et al. | 705/72 |
| 5,020,105 | A  * | 5/1991 | Rosen et al. | 705/66 |
| 5,153,919 | A  * | 10/1992 | Reeds et al. | 380/44 |
| 5,371,794 | A  * | 12/1994 | Diffie et al. | 713/156 |
| 5,537,474 | A  * | 7/1996 | Brown et al. | 380/248 |
| 5,590,199 | A  * | 12/1996 | Krajewski et al. | 713/159 |
| 5,708,710 | A  * | 1/1998 | Duda | 380/247 |
| 5,794,139 | A  * | 8/1998 | Mizikovsky et al. | 455/403 |
| 5,812,955 | A  * | 9/1998 | Dent et al. | 455/561 |
| 5,991,407 | A  * | 11/1999 | Murto | 380/248 |
| RE36,946 | E  * | 11/2000 | Diffie et al. | 380/278 |
| 6,148,405 | A  * | 11/2000 | Liao et al. | 726/2 |
| 6,317,028 | B1 | 11/2001 | Valiulis | 340/10.4 |
| 6,345,043 | B1 | 2/2002 | Hsu | 370/324 |
| 6,393,270 | B1 * | 5/2002 | Austin et al. | 455/411 |
| 6,408,175 | B1 * | 6/2002 | Park | 455/411 |
| 6,546,492 | B1 * | 4/2003 | Walker et al. | 726/3 |
| 6,550,008 | B1 * | 4/2003 | Zhang et al. | 713/155 |
| 6,567,920 | B1 * | 5/2003 | Cromer et al. | 726/3 |

(Continued)

FOREIGN PATENT DOCUMENTS

GB    EP 0998095 A2 *   3/2000

*Primary Examiner* — Eleni Shiferaw
*Assistant Examiner* — Jeffery Williams
(74) *Attorney, Agent, or Firm* — Wall & Tong, LLP (57) ABSTRACT

A scheme for authentication, dynamic key generation and exchange provides means for authentication of mobile nodes and networks, and for generation of per session, per node, security association and encryption keys for encrypting/decrypting communications between a mobile node and an access point in wireless local area networks. The scheme utilizes the same infrastructure and authentication information for both data link layers (layer 2) and network layers (layer 3). This scheme is particularly applicable to networks adhering to the IEEE 802 LAN family of standards.

20 Claims, 5 Drawing Sheets

U.S. PATENT DOCUMENTS

| | | | |
|---|---|---|---|
| 6,591,364 B1* | 7/2003 | Patel | 713/170 |
| 6,611,913 B1* | 8/2003 | Carroll et al. | 713/171 |
| 6,680,923 B1* | 1/2004 | Leon | 370/328 |
| 6,704,789 B1* | 3/2004 | Ala-Laurila et al. | 709/230 |
| 6,745,326 B1* | 6/2004 | Wary | 713/168 |
| 6,839,553 B2* | 1/2005 | Park | 455/411 |
| 6,889,328 B1* | 5/2005 | Sanchez Herrero et al. | 726/3 |
| 6,918,035 B1* | 7/2005 | Patel | 713/169 |
| 6,925,297 B2* | 8/2005 | Wenzel | 455/411 |
| 7,003,282 B1* | 2/2006 | Ekberg | 455/411 |
| 7,107,051 B1* | 9/2006 | Walker | 455/432.1 |
| 7,107,620 B2* | 9/2006 | Haverinen et al. | 726/29 |
| 7,131,006 B1* | 10/2006 | Carroll | 713/171 |
| 7,190,793 B2* | 3/2007 | Hsu | 380/270 |
| 7,193,985 B1* | 3/2007 | Lewis et al. | 370/338 |
| 7,203,482 B2* | 4/2007 | Blumenthal et al. | 455/411 |
| 7,213,144 B2* | 5/2007 | Faccin et al. | 713/153 |
| 7,389,105 B2* | 6/2008 | Ala-Laurila et al. | 455/406 |
| 2001/0048744 A1* | 12/2001 | Kimura | 380/247 |
| 2002/0012433 A1* | 1/2002 | Haverinen et al. | 380/247 |
| 2003/0065919 A1* | 4/2003 | Albert et al. | 713/168 |
| 2005/0078824 A1* | 4/2005 | Malinen et al. | 380/247 |
| 2005/0113067 A1* | 5/2005 | Marcovici et al. | 455/411 |
| 2005/0135624 A1* | 6/2005 | Tsai et al. | 380/270 |
| 2005/0177733 A1* | 8/2005 | Stadelmann et al. | 713/185 |
| 2006/0073811 A1* | 4/2006 | Ekberg | 455/411 |
| 2006/0291455 A1* | 12/2006 | Katz et al. | 370/355 |

* cited by examiner

SCHEME FOR AUTHENTICATION AND DYNAMIC KEY EXCHANGE

CROSS-REFERENCE TO RELATED APPLICATION

The present application claims priority to U.S. Provisional Application Ser. No. 60/318,736, filed Sep. 13, 2001, entitled "Authentication of Mobile Nodes On A Wireless Telecommunications System," the entirety of which is incorporated herein by reference. The present application also hereby incorporates by reference in its entirety each of U.S. Non-provisional application Ser. No. 10/190,171, filed on Jul. 3, 2002, entitled "Scheme For Authentication And Dynamic Key Exchange", and U.S. Provisional Application Ser. No. 60/303,262, filed Jul. 5, 2001, entitled "Scheme for Authentication and Dynamic Key Exchange in 802.11 Networks".

FIELD OF THE INVENTION

The present invention relates to authentication and key exchange methods, and more specifically to authentication and key exchange methods in wireless LAN networks.

BACKGROUND

Wireless local area networks (LANs) provide Internet access in hard-to-wire places such as airports, malls, and theaters. Due to the physically open and uncontrolled nature of the communications medium, e.g., radio frequency electromagnetic radiation, security is a concern. One of the existing standards for wireless LANs is a standard approved by the Institute of Electrical and Electronic Engineers (IEEE), commonly referred to as IEEE 802.11. This standard provides specifications related, among others, to access security, e.g., authentication and encryption.

Networks conforming to the IEEE 802.11 standard, referred to as 802.11 networks, typically comprise mobile nodes (MNs), such as personal computers (PCs) or personal digital assistants (PDAs). These MNs gain access to the 802.11 network via an Access Point (AP). An AP provides communication between a MN in a wireless LAN and another MN in the same or another LAN. In accordance with the IEEE 802.11 standard, before a MN can access the network, (1) it must be authenticated to verify its access privileges, and (2) a security association in the form of a shared secret key must be established between the AP and the MN. The AP and the MN use this key to encrypt all data communications between the AP and the MN. However, there are several disadvantages associated with the current IEEE 802.11 authentication and encryption schemes. First, the current authentication protocol for 802.11 networks specifies a shared key authentication method, wherein the AP and the MN are previously (prior to attempted communications) provided with the same shared secret key, to realize the mechanism for the AP to grant authentication and association to a specific MN. This typically requires that the secret key be delivered to the MN via a secure channel or mechanism independent of the 802.11 network.

Another disadvantage is that the same shared key used for authentication is also used for encryption. This requires that each time a new MN is added or an existing MN leaves the trusted, shared relationship, the key must be changed and delivered reliably to each MN. This makes the authentication scheme cumbersome and unsuitable for public networks, which typically require per user, per session keys.

Along with authentication requirements at the initial connection between the MN and the AP (commonly referred to as the data link layer or layer-2), there are authentication requirements at higher levels, such as on the network layer (layer-3). It is not uncommon for a user to carry a mobile device across multiple LANs with different network addresses. This roaming ability also requires an authentication routine to be executed between the MN and each AP encountered. As currently contemplated, the aforementioned data link layer and network layer authentication schemes are separately employed and utilize different algorithms and authentication information. This dual process is inherently inefficient and slows the authentication process. An improved scheme for authentication and key exchange is desired.

SUMMARY OF THE INVENTION

A system for authentication, dynamic key generation and exchange provides means for authentication of mobile nodes and networks, and provides for generation of per session, per node, security keys for encrypting/decrypting communications between a mobile node and an access point in wireless local area networks using the same infrastructure and authentication information for both the data link and network layers.

In one embodiment, a method for authenticating a mobile node and a network, and establishing a temporary security association between the mobile node and a network includes receiving, at the mobile node, a signal indicative of a request for identification and an access point identifier. A signal indicative of a mobile node network access identifier and a session identifier is conveyed from the mobile node to the network, in response to the request for identification. The mobile node randomly generates the session identifier. A first random number is generated and a signal indicative of the first random number is conveyed from the network to the mobile node. A second random number is generated at the mobile node. A first authenticator is generated at the mobile node as a function of the first random number, the second random number, the network access identifier for the mobile node, a predetermined security key, the access point identifier, and the session identifier. A signal indicative of the first authenticator and the second random number is conveyed from the mobile node to the network. An interim first authenticator is generated at the network as a function of the first random number, the second random number, the network access identifier for the mobile node, the predetermined security key, the access point identifier, and the session identifier. The first authenticator is compared with the interim first authenticator, and if they match, a second authenticator is generated as a function of the second random number, the first random number, the network access identifier, the predetermined security key, the access point identifier, and the session identifier. A security key is generated as a function of the predetermined security key and the second authenticator. A signal indicative of the second random number and the second authenticator is conveyed from the network to the mobile node. An interim second authenticator is generated as a function of the second random number, the conveyed first random number, the network access identifier for the mobile node, the predetermined security key, the access point identifier, and the session identifier. The second authenticator is compared with the interim second authenticator, and if they match, the security key is generated at the mobile node.

In another embodiment, a system for authenticating a mobile node and a network, and for establishing a temporary security association between the mobile node and the network includes a mobile node having a transmitter/receiver portion, a mobile node authenticator processor, and a mobile node key generator. The mobile node transmitter/receiver portion is configured to receive at least one signal indicative of at least one of a first random number, a second authenticator, and an access point identifier; and provide a signal indicative of at least one of a first authenticator, a second random number, a session identifier, and a network access identifier for the mobile node. The mobile node authenticator processor is configured to generate the first authenticator as a function of the first random number, the second random number, the network access identifier for the mobile node, a predetermined security key, the access point identifier, and the session identifier. The mobile node authenticator processor is also configured to generate an interim second authenticator as a function of the second random number, the first random number, the network access identifier for the mobile node, the predetermined security key, the access point identifier, and the session identifier, and compare the second authenticator with the interim second authenticator. The mobile node key generator is configured to generate a security key as a function of the predetermined security key and the second authenticator. The network includes a network transmitter/receiver portion, a network authenticator processor, and a network key generator. The network transmitter/receiver portion is configured to receive a signal indicative of at least one of the first authenticator, the second random number, the network access identifier for the mobile node, and the session identifier, and provide at least one signal indicative of at least one of the first random number, the second authenticator, and the access point identifier. The network authenticator processor is configured to generate an interim first authenticator as a function of the first random number, the second random number, the network access identifier for the mobile node, the predetermined security key, the access point identifier, and the session identifier. The network authenticator processor is also configured to compare the first authenticator with the interim first authenticator and generate the second authenticator. The network key generator is configured to generate the security key as a function of the predetermined security key and the second authenticator for a current session, wherein the security key is an ephemeral security key configured to perform at least one of the functions of encrypting and decrypting communications between the mobile node and the network for a current session, and deriving other ephemeral security keys for generating a temporary security association between the mobile node and the network.

DETAILED DESCRIPTION

A scheme for authentication, dynamic key generation and exchange as described herein provides means for mutual authentication of mobile nodes (MNs) and networks, and for generation of per session, per node, encryption keys for encrypting/decrypting communications between a MN and an access point (AP) in wireless local area networks (LANs). The scheme is applicable to both data link layers (layer 2) and network layers (layer 3). This scheme is particularly applicable to networks adhering to the IEEE 802 LAN family of standards, referred to as 802 networks. To aid in understanding this scheme, a list of abbreviations and acronyms is provided in Table 1.

TABLE 1

| | |
|---|---|
| $k_{A-B}$ | Secret key shared between nodes A and B |
| AAA | Authentication, authorization, and accounting server |
| AP | Access Point |
| MN | Mobile Node |
| NAI | Network Access Identifier |
| $A_{A-B}$ | A security association between nodes A and B allowing secure exchange of information between nodes A and B. |

Figure 1:
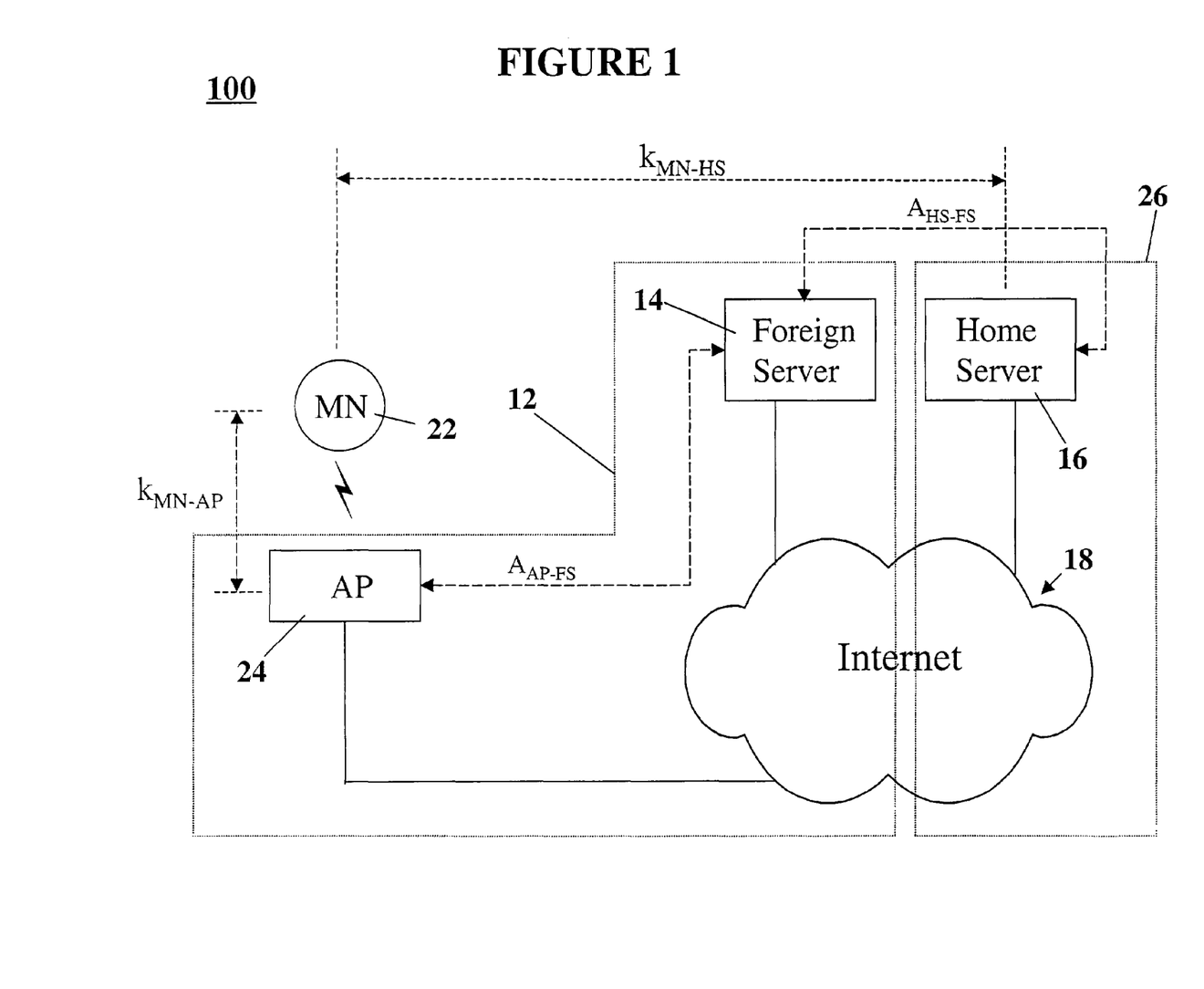
FIG. 1 is an illustration of a mobile node communicating with a foreign network via an access point.

FIG. 1 is an illustration of a mobile node (MN) 22 communicating with a foreign network 12 via an access point (AP) 24. Examples of mobile nodes include programmable digital assistants (PDAs), cellular phones, PALM devices, notebooks, e.g., laptops, personal computers (PCs), or a combination thereof. The MN 22 is associated with a home server 16. In one embodiment, the home server 16 is an authentication, authorization, and accounting (AAA) server. The home server 16, functioning as a home authentication, authorization, and accounting server (H-AAA), maintains security-related information pertaining to the MN 22. This security-related information may include information such as the MN's 22 network access identifier (NAI) and a security key, $k_{MN-HS}$, shared by the MN and the home server 16. The MN's 22 NAI allows the MN to access a network having the ability to verify the NAI. As an analogy, the MN's NAI may be compared to a user ID used to gain access to a network. This shared key, $k_{MN-HS}$, is maintained by the MN 22 and the home server 16 and is used to generate authenticators and ephemeral encryption keys.

The foreign network 12 comprises the AP 24 and the foreign server 14. The AP 24 and the foreign server 14 are communicatively coupled via the Internet 18. This communicative coupling is exemplary. The AP 24 may be communicatively coupled to the foreign server 14 via any appropriate communicatively coupling technology, such as wireless, wireline, optical, electromagnetic, infrared, or a combination thereof. The foreign server 14 may function as an AAA server, also referred to as an F-AAA. Functioning as an F-AAA, foreign server 14 maintains security-related information pertaining to the AP 24. As shown in FIG. 1, security associations exist between the AP 24 and the foreign server 14 (as indicated by the dotted line labeled $A_{AP-FS}$), and between the home server 16 and the foreign server 14 (as indicated by the dotted line labeled $A_{HS-FS}$). Also, a predetermined security key, $k_{MN-HS}$, is shared between the MN 22 and the home server 16, as indicated by the dotted line labeled $k_{MN-Hs}$.

The depiction of foreign network 12 and home network 26 in FIG. 1 as separate networks is exemplary. The home network 26 and the foreign network 12 may comprise common components, devices, processors, interfaces, or a combination thereof. In one exemplary embodiment, the foreign network 12 and the home network 26 are a single network.

In an exemplary scenario in accordance with the scheme for authentication, dynamic key generation and exchange in accordance with the present invention, the MN 22 is associated with the home server 16. As the MN node moves away from the home server 16, communication between the two may rely on a third party. This reliance may be a result of, for example, the MN 22 being physically moved, e.g., in a vehicle, away from the home server 16. Once the MN 22 is no longer in direct communications with the home server 16, the MN 22 tries to gain access to the home network 26 via a foreign network with which the MN 22 is currently able to communicate, e.g., foreign network 12. Before secure communications can begin between the foreign network 12, via the access point 24, the MN 22 must be authenticated and a security key (indicated as $k_{MN-AP}$ in FIG. 1) for encrypting/decrypting communications between the MN 22 and the AP 24 must be generated and provided to the MN 22 and the AP 24. However, because the communication path between the MN 22 and the AP 24 may be subject to being monitored, the security key, $k_{MN-AP}$, may not be directly transmitted between the AP 24 and the MN 22. As described in greater detail below, the scheme for authentication, key generation, and exchange includes the MN 22 communicating with the AP 24 via a non-secure communications path, the AP 24 communicating with the foreign server 14 via a secure communications path (security association AAP-FS), and the foreign server 14 communicating with the home server 16 via a secure communications path (security association $A_{HS-FS}$).

Figure 2:
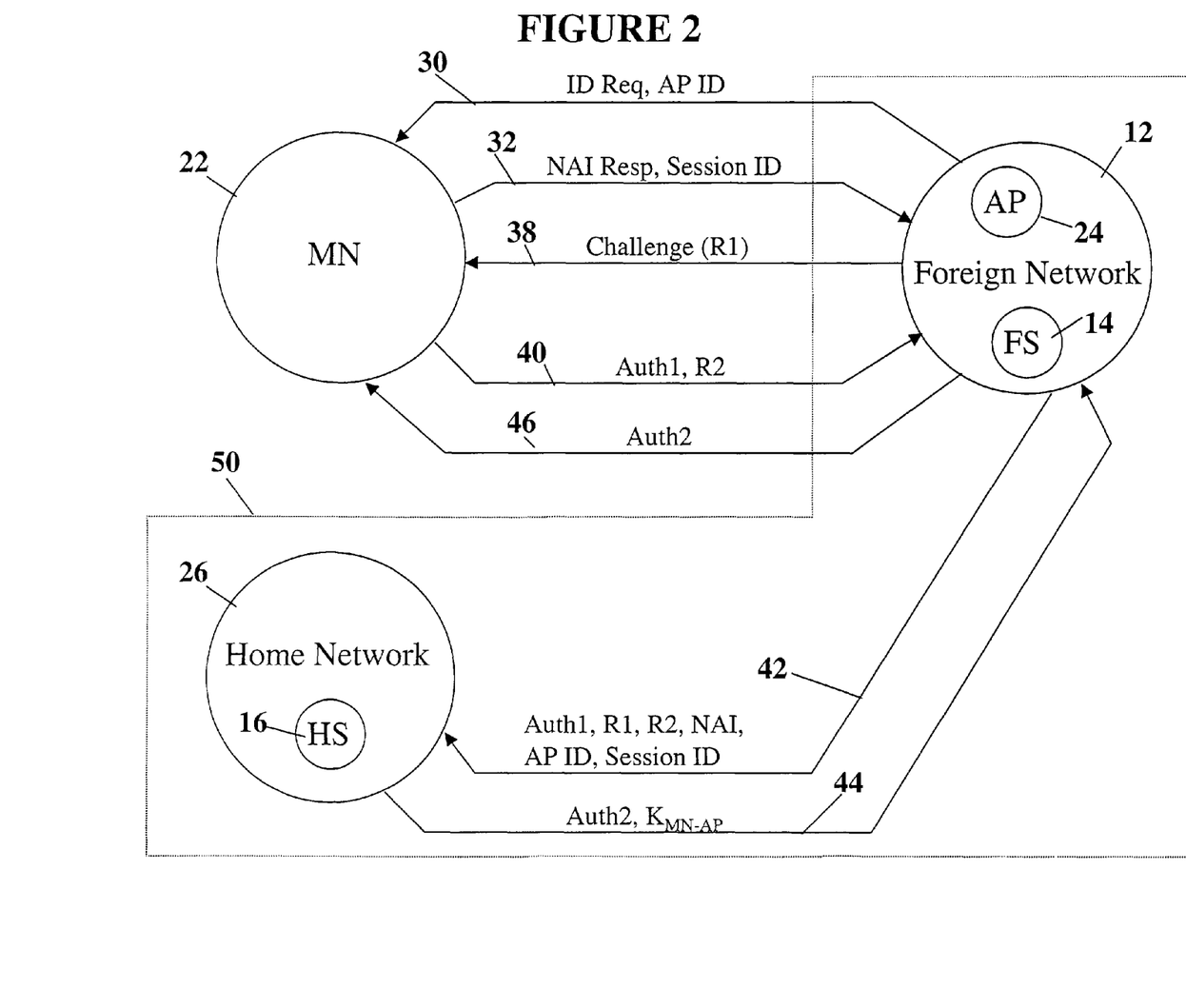
FIG. 2 a data flow diagram of a scheme for authentication, dynamic key generation and exchange between a mobile node and a network.

FIG. 2 is a data flow diagram of a scheme for authentication, dynamic key generation and exchange between a MN 22 and a network 50. Network 50 may be a single network or comprise a foreign network 12 and a home network 26. The following description is in terms of the foreign network 12 and the home network 26. Also, communication between the foreign network 12 and the home network 26 may be via any appropriate device. In an exemplary embodiment, communication between the foreign network 12 and the home network 26 is via the foreign server 14 and the home server 16.

In operation, as the MN 22 enters various regions, it tries to communicate with foreign networks in those regions. In order to communicate with a foreign network, e.g., via an AP, it must make itself known to the foreign network. This may be accomplished by the AP 24 listening for signals provided by the MN 22 or by the MN 22 listening for signals provided by the AP 24, or a combination thereof. After the MN 22 sends a start signal to the AP 24, the MN 22 attaches to the MN 22. The foreign network 12 provides a signal 30 to the MN 22 comprising an AP identifier (AP ID) and requesting the MN 22 for identification. The AP ID is an identifier, which may be unique to a specific AP, or unique to a specific installation/application. The MN 22 responds by providing signal 32, which includes the MN's 22 network access identifier (NAI), and a random session identifier (Session ID) generated by the MN 22. The session ID is randomly generated by the MN 22 utilizing a random number generator (or pseudo-random number generator). The signal 32 is provided to the foreign network 12 via AP 24. The MN's 22 NAI is a network access identifier, which grants the MN 22 access to the home network 26.

The foreign network 12 acknowledges the received NAI and provides a signal 38 to the MN 22 comprising a challenge to the MN 22 to authenticate itself. The challenge is in the form of a randomly generated number (indicated as first random number, R1, in FIG. 2). The MN 22 generates a second random number (indicated as R2 in FIG. 2), and a first authenticator (indicated as Auth1, in FIG. 2) as a function of the first random number, the second random number, the MN's 22 NAI, the AP ID, the session ID, and the predetermined security key, $k_{MN-HS}$. This first authenticator is provided to the foreign network 12 via signal 40. The foreign network 12 then provides signal 42 to the home network 26. Signal 42 comprises the first authenticator, the first random number, the second random number, the AP identifier (AP ID), the session identifier (session ID), and the MN's 22 NAI. The home network 26 determines if the first authenticator, Auth1, is valid. If it is determined that the first authenticator, Auth1, is valid, the home network 26 then generates a second authenticator (indicated as Auth2 in FIG. 2) as a function of the second random number (R2), the first random number (R1), the MN's 22 NAI, the AP ID, the session ID and the predetermined security key, $k_{MN-HS}$.

Next, the home network 26 generates an ephemeral security key ($k_{MN-AP}$) to be used to encrypt/decrypt communications between the MN 22 and the AP 24, or to derive other ephemeral security keys used to setup the temporary security association between the foreign network and the mobile node. This security key, $k_{MN-AP}$, is generated as a function of the second authenticator and the predetermined security key, $k_{MN-HS}$, shared by the MN 22 and the home network 26. The home network 26 provides signal 44 to the foreign network 12. The signal 44 comprises the second authenticator, Auth2, and the security key, $k_{MN-AP}$. At this point, the foreign network has the security key, $k_{MN-AP}$, which can be used to encrypt communications to be provided to the MN 22 and decrypt communications received from MN 22. The foreign network 12, next provides signal 46, comprising the second authenticator, Auth2, to the MN 22. The MN 22 determines if the second authenticator, Auth2, is valid. If it is determined that the second authenticator, Auth2, is valid, the MN 22 generates the same security key, $k_{MN-AP}$, using the generation process as used by the home network 26. The MN 22 generates the security key, $k_{MN-AP}$, as a function of the second authenticator, Auth2 and the predetermined security key, $k_{MN-HS}$. Now, both the MN 22 and the foreign network 12 have the security key, $k_{MN-AP}$, which can be used to encrypt and decrypt communications between the AP 24 and the MN 22. Both the foreign network 12 and the MN 22 have the same security key, $k_{MN-AP}$, which was not transmitted via a non-secure communications path, and specifically not transmitted between the MN 22 and the AP 24.

The security key, $k_{MN-AP}$, is an ephemeral security key. A new security key, $k_{MN-AP}$, is generated for each MN 22 and for each session. If a second MN enters the area to communicate with the foreign network 12, a new security key, $k_{MN-AP}$, is generated for that MN using the process described above. Also, each time the MN 22 starts a new communications session with the foreign network 12, a new security key, $k_{MN-AP}$, is generated. Thus, if security is breached for a particular session, e.g., security key, $k_{MN-AP}$, is obtained by an unauthorized entity, that security key, $k_{MN-AP}$, can not be used to breach the security of the next communication session.

Figure 3:
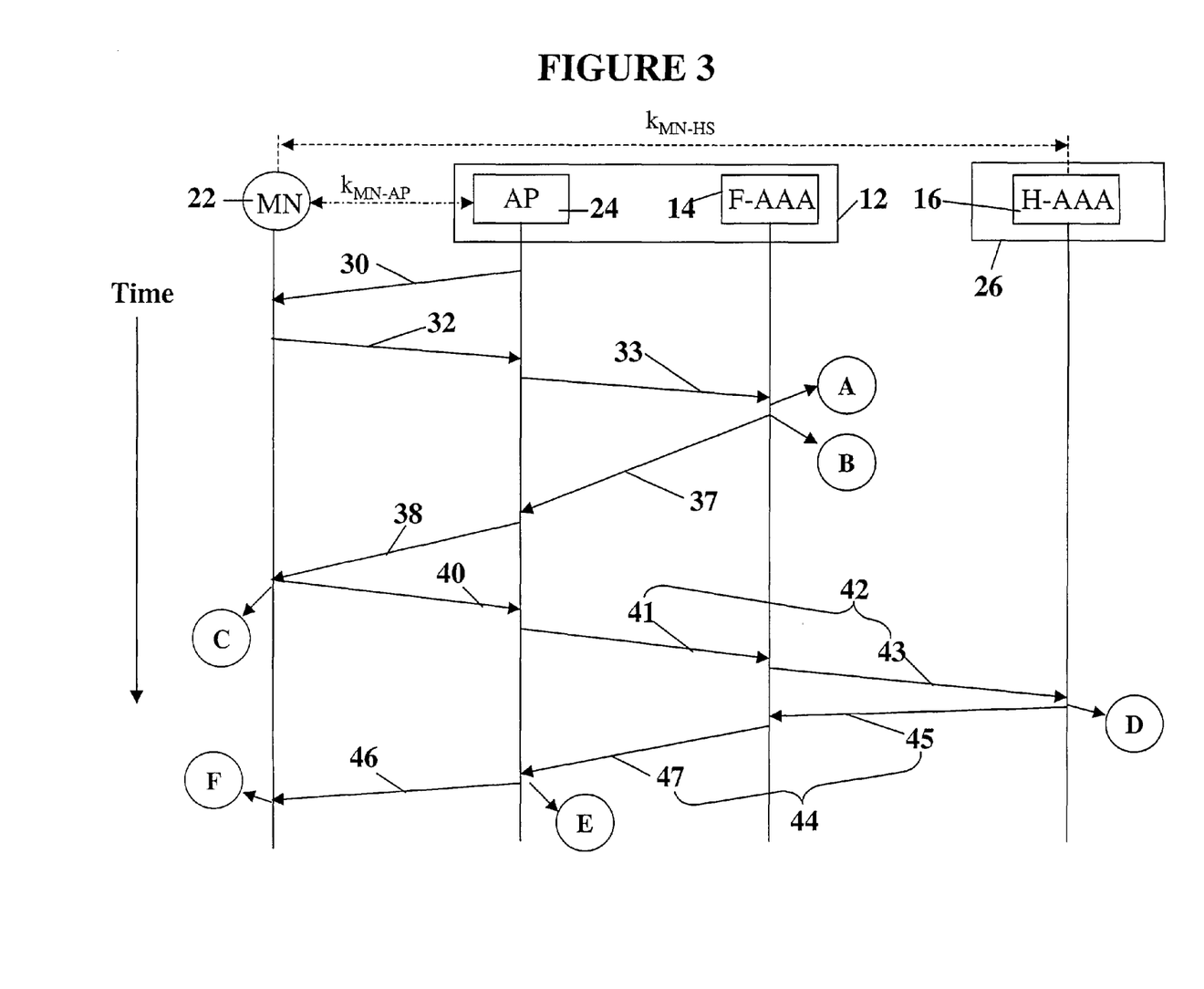
FIG. 3 is a timing diagram of a scheme for authentication, dynamic key generation and exchange for a mobile node, an access point, a home authentication, authorization, and accounting server, and a foreign authentication, authorization, and accounting server.

FIG. 3 is a timing diagram of a scheme for authentication, dynamic key generation and exchange for a MN 22, an AP 24, a F-AAA 14, and a H-AAA 16. As indicated in FIG. 3, foreign network 12 comprises AP 24 and foreign server 14 functioning as a F-AAA 14, and home network 26 comprises home server 16 functioning as a H-AAA 16. In one embodiment, networks 12 and 26 conform to the IEEE 802 LAN family of standards (802 networks). The shared key, $k_{MN-HS}$, is the predetermined security key shared between the MN 22 and the H-AAA 16. Prior to the MN 22 attempting to communicate with the AP 24, it is assumed that a pre-configured security association between the MN 22 and the H-AAA 16, utilizing the key, $k_{MN-HS}$, already exists. The key, $k_{MN-HS}$, may be provided as a result of a service contract between a user, e.g., an owner of a MN, and a network provider, for example.

As indicated in FIG. 3, time is represented on the vertical axis. The AP 24 provides signal 30 to the MN 22. Signal 30 comprises the AP ID and a request for identification from the MN 22. The MN 22 responds to this request for identification by providing signal 32, which comprises the MN's 22 NAI and the session ID, which is randomly generated by the MN 22. Next, the AP 24 provides signal 33 to the F-AAA 14. The FAAA 14 acknowledges receipt of the MN's 22 NAI at step A, generates a first random number (indicated as R1 in FIG. 2) at step B, and provides signal 37 to the AP 24 in response to receiving signal 33.

The first random number may be generated by any appropriate random number generator. Although the first random number may comprise any number of bits, it is advantageous if the first random number contains at least 128 bits, to ensure a proper level of security. The first random number is provided to the MN 22, as a challenge to the MN 22 to authenticate itself. The first random number is provided via signal 38 by AP 24, which relays it to the MN 22 after receiving it from F-AAA 14 in signal 37. In response to receiving the signal 38, the MN 22 generates a second random number (indicated as R2 in FIG. 2). Although the second random number may comprise any number of bits, it is advantageous if the second random number contains at least 128 bits, to ensure a proper level of security. MN 22 then generates the first authenticator at step C. The first authenticator is generated as a function of the first random number received via the signal 38, the second random number, the predetermined security key, $k_{MN-HS}$, shared by the MN 22 and by the home AAA server 16, the MN's 22 NAI, the AP ID and the session ID. The first authenticator may be generated using any appropriate keyed-Message Authentication Code, such as the well-known keyed SHA-1 algorithm.

Upon generating the first authenticator, the MN 22 provides signal 40 to the AP 24 comprising the first authenticator and the second random number. The AP 24 then provides the first authenticator, the MN's 22 NAI, the AP ID, the session ID, the first random number and the second random number to the F-AAA 14 via signal 41. The F-AAA 14 in turn provides the first authenticator, the MN's 22 NAI, the AP ID, the session ID, the first random number and the second random number to the H-AAA 16 via signal 43. Signals 41 and 43 are encompassed in signal 42 of FIG. 2.

Upon receiving the signal 43, the H-AAA 16 determiners if the first authenticator, Auth1, is valid. This is accomplished by generating an interim first authenticator and comparing the interim first authenticator to the first authenticator at step D. The interim first authenticator is generated using the same algorithm used to generate the first authenticator, e.g., keyed SHA-1 algorithm. The interim first authenticator is generated as a function of the first random number, the second random number, the predetermined security key, $k_{MN-HS}$, shared by the MN 22 and by the HAAA server 16, the MN's 22 NAI, the AP ID and the session ID. The first authenticator is compared to the interim first authenticator at step D. If the first authenticator and the interim first authenticator match, a second authenticator, Auth2, is generated at step D. The second authenticator, Auth2, is generated as a function of the second random number, the first random number, the predetermined security key, $k_{MN-HS}$, shared by the MN 22 and by the home AAA server 16, the MN's 22 NAI, the AP ID and the session ID. The second authenticator may be generated using any appropriate keyed-Message Authentication Code, such as the well known keyed SHA-1 algorithm. The order in which the parameters are used in generation of the second authenticator preferably differs from the order in which parameters are used in the generation of the first authenticator. Next, the security key, $k_{MN-AP}$, is generated at step D. The security key, $k_{MN-AP}$, is generated as a function of the second authenticator and the predetermined security key, $k_{MN-HS}$. The security key, $k_{MN-AP}$, may be generated by any appropriate algorithm. In one embodiment, the security key, $k_{MN-AP}$, is generated as a function of the key, $k_{MN-HS}$, using the keyed SHA-1 algorithm.

The security key, $k_{MN-AP}$, and the second authenticator, Auth2, are provided to the F-AAA 14 via signal 45. The F-AAA 14 then provides the security key, $k_{MN-AP}$, and the second authenticator to the AP 24 via signal 47. Signals 45 and 47 are encompassed in signal 44 of FIG. 2. The security key, $k_{MN-AP}$, is extracted from the signal 47 at step E. This security key, $k_{MN-AP}$, is stored in the foreign network 12, such as in the AP 24, to be used to encrypt and decrypt communications between the AP 24 and the MN 22. However, at this point, the MN 22 does not have the security key, $k_{MN-AP}$. To maintain security, the security key, $k_{MN-AP}$ is not transmitted directly to the MN 22. Rather, the AP 24 then provides the second authenticator, Auth2, to the MN 22 via signal 46. The MN 22 determines if the second authenticator, Auth2, is valid at step F. This is accomplished by generating an interim second authenticator and comparing the interim second authenticator to the second authenticator (at step F). The interim second authenticator is generated using the same algorithm used to generate the second authenticator, e.g., keyed SHA-1 algorithm. The interim second authenticator is generated as a function of the second random number, the first random number, the predetermined security key, $k_{MN-HS}$, shared by the MN 22 and by the HAAA server 16, the MN's 22 NAI, the AP ID, and the session ID. The second authenticator is compared to the interim second authenticator at step F. If the second authenticator matches the interim second authenticator, the MN 22 generates the security key, $k_{MN-AP}$, at step F. The MN 22 generates the security key, $k_{MN-AP}$, using the same algorithm used to generate the security key, $k_{MN-AP}$, by the H-AAA 16 at step D, e.g., keyed SHA-1 algorithm. The MN 22, at step F, generates the security key, $k_{MN-AP}$, as a function the second authenticator, Auth2, received via signal 46, and the predetermined security key, $k_{MN-HS}$. At this point, both the AP 24 and the MN 22 have the same security key, $k_{MN-AP}$, which is used to encrypt and decrypt communication between the AP 24 and the MN 22. The process of generating a security key, $k_{MN-AP}$, as described above, is repeated each time the MN 22 starts a new session, or each time a new MN accesses the AP 24. Thus the security key, $k_{MN-AP}$, is generated on a per session, per node basis.

Figure 4:
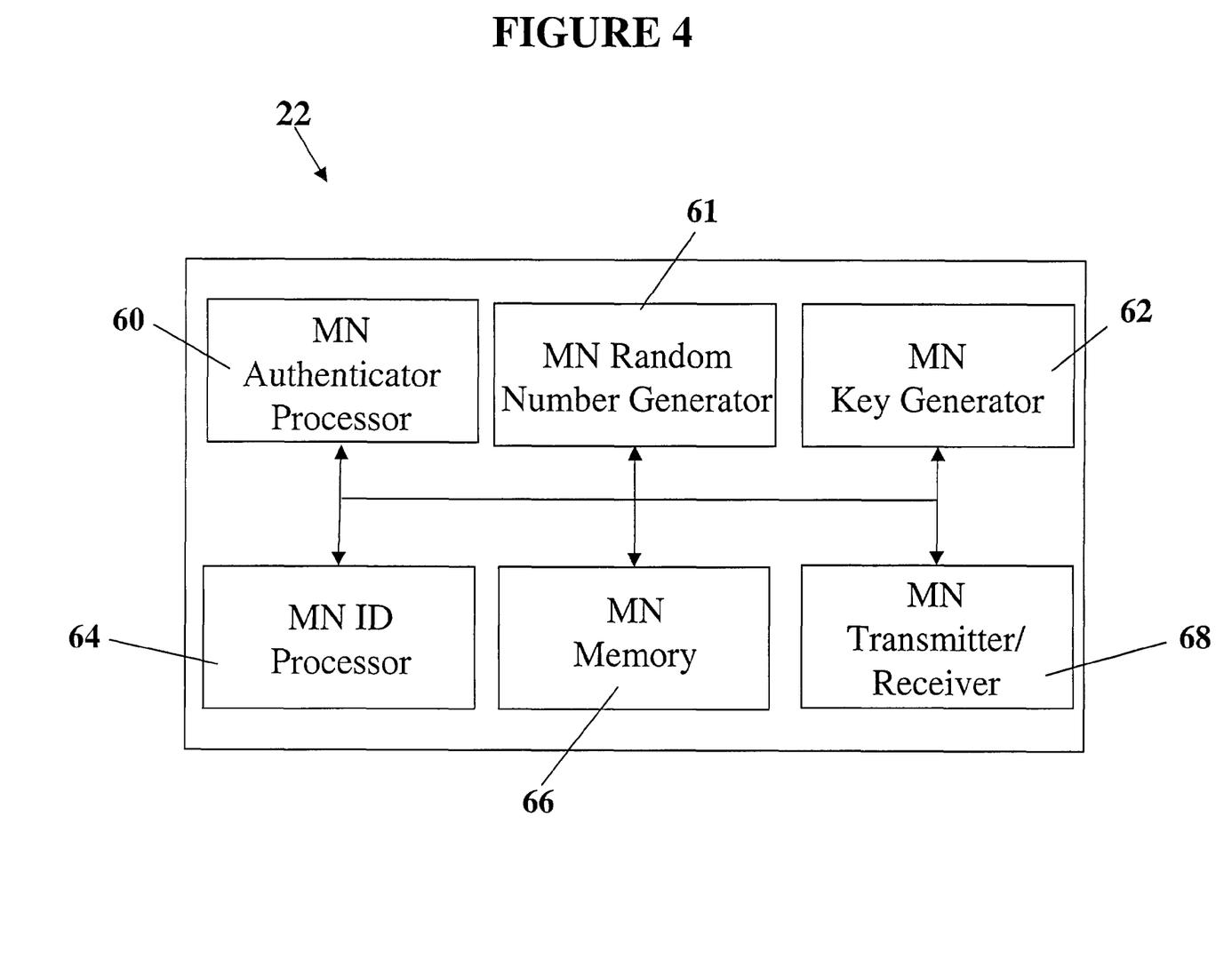
FIG. 4 is a functional block diagram of a mobile node in accordance with the present invention.

FIG. 4 is a functional block diagram illustrating portions of a MN 22 used in conjunction with a scheme for authentication and dynamic key exchange in accordance with the present invention. MN 22 comprises a MN authenticator processor 60, a MN random number generator 61, a MN key generator 62, a MN identification (ID) processor 64, a MN memory portion 66, and a MN transmitter/receiver 68. The MN random number generator 61 generates the session ID and the second random number. The MN authenticator processor 60 generates the first authenticator as a function of the first random number, the second random number, the predetermined security key, $k_{MN-HS}$, the AP ID, the session ID, and the MN's NAI. The MN authenticator processor 60 generates the interim second authenticator and compares the second authenticator with the interim second authenticator. The MN authenticator processor 60 generates the interim second authenticator as a function of the second random number, the first random number, the predetermined security key, $k_{MN-HS}$, shared by the MN 22 and by the HAAA server 16, the AP ID, the session ID, and the MN's 22 NAI. The MN key generator 62 generates the security, $k_{MN-AP}$, as a function of the second authenticator, and the predetermined security key, $k_{MN-HS}$. The MN ID processor 64 provides the MN's NAI is response to an ID request. In another embodiment, the MN ID processor 64 performs processing associated with gaining initial access to a network, such as polling a network for a response from an AP, listening for a signal, e.g., probe signal, from an AP and responding accordingly, or a combination thereof. The MN memory portion 66 stores and provides access to the MN's NAI and the predetermined security key, $k_{MN-HS}$. The MN transmitter/receiver 68 performs the functions associated with receiving and transmitting signals to and from the MN 22. The depiction of the various functional blocks as separate entities is exemplary. The various functions may be performed by separate, dedicated processors, by a distributed processor system, or a combination thereof. For example, the MN memory portion 66 may not exist as a separate memory, but may be distributed, such that memory is incorporated into each of the functional blocks.

Figure 5:
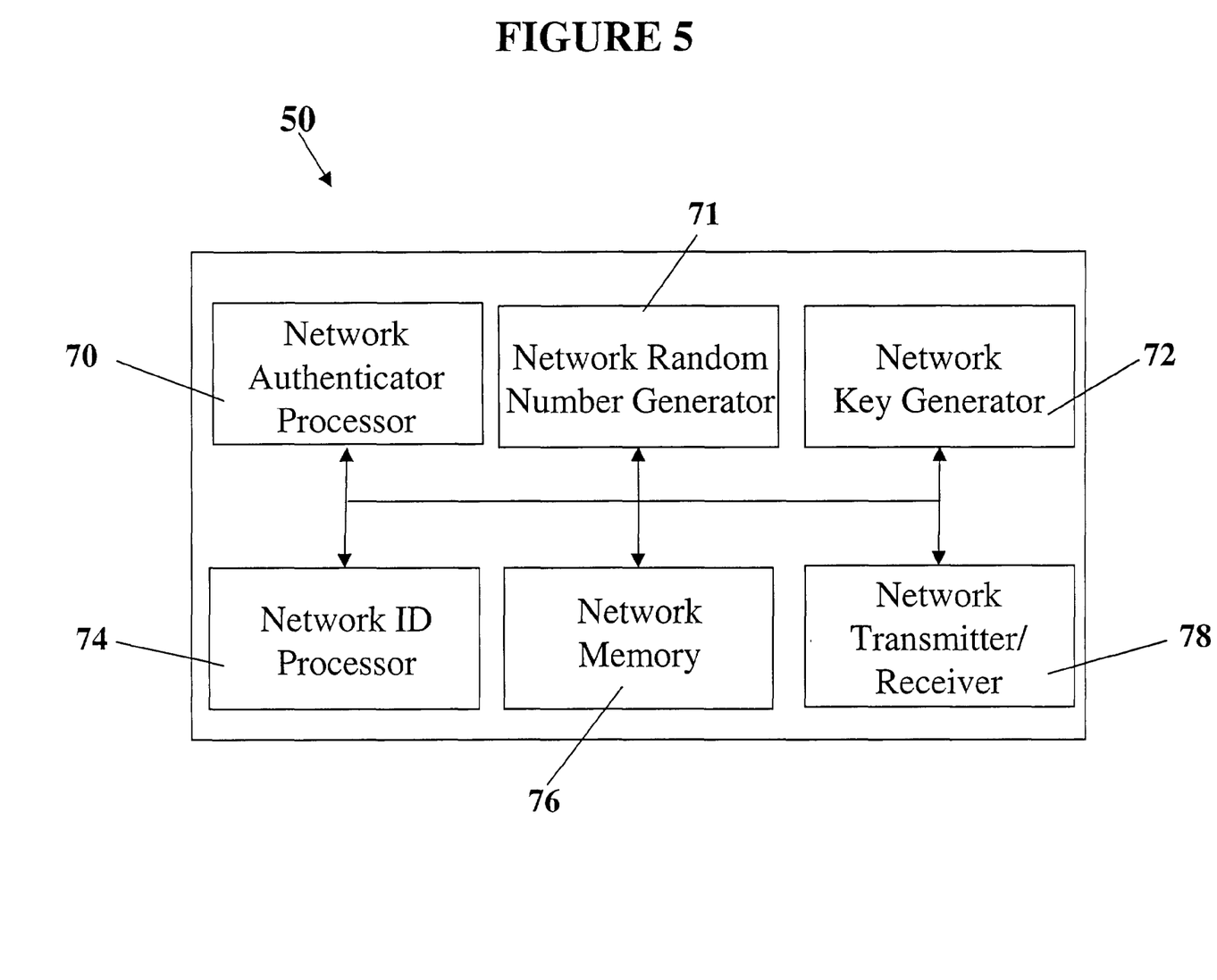
FIG. 5 is a functional block diagram of a network in accordance with the present invention.

FIG. 5 is a functional block diagram of a network 50 used in conjunction with a scheme for authentication and dynamic key exchange in accordance with the present invention. The network 50 may comprise a single network or a plurality of networks. In one embodiment the network 50 comprises a foreign network and a home network (See FIG. 2, for example). As shown in FIG. 5, the network 50 comprises a network authenticator processor 70, a network random number generator 71, a network key generator 72, a network identification (ID) processor 74, a network memory portion 76, and a network transmitter/receiver 78. The network authenticator processor 70 generates the interim first authenticator and compares the first authenticator with the interim first authenticator. The network random number generator 71, generates the first random number. The network key generator 72 generates the security, $k_{MN-AP}$, as a function of the second authenticator and the predetermined security key, $k_{MN-HS}$. The network ID processor 74 performs processing associated with allowing the MN 22 to gain initial access to the network, such as polling a region to detect a MN, listening for a signal, e.g., probe signal, from a MN and responding accordingly, or a combination thereof. In one embodiment, the network ID processor 74 also performs the processing associated with acknowledging the MN's response of identification, e.g., MN's NAI. The network memory portion 76 stores and provides access to the MN's NAI and the predetermined security key, $k_{MN-HS}$. The network transmitter/receiver 78 performs the functions associated with receiving and transmitting signals to and from the network 50. The depiction of the various functional blocks as separate entities is exemplary. The various functions may be performed by separate, dedicated processors, by a distributed processor system, or a combination thereof. For example, the network 50 may comprise a foreign network 12 and a home network 26, wherein the network authenticator processor 70 is a function of the home network 26, the network random number generator 71 is a function distributed between both the home network 26 and the foreign network 12, the network key generator 72 is a function of the home network 26, the network ID processor 74 is a function distributed between both the home network 26 and the foreign network 12, the network memory portion 76 is a function distributed between both the home network 26 and the foreign network 12, and the network transmitter/receiver 78 is a function distributed between both the home network 26 and the foreign network 12.

The scheme for authentication, dynamic key generation and exchange as described herein may be embodied in the form of computer-implemented processes and apparatus for practicing those processes. The scheme for authentication, dynamic key generation and exchange as described herein may also be embodied in the form of computer program code embodied in tangible media, such as floppy diskettes, read only memories (ROMs), CD-ROMs, hard drives, high density disk, or any other computer-readable storage medium, wherein, when the computer program code is loaded into and executed by a computer, the computer becomes an apparatus for practicing the invention. The scheme for authentication, dynamic key generation and exchange as described herein may also be embodied in the form of computer program code, for example, whether stored in a storage medium, loaded into and/or executed by a computer, or transmitted over some transmission medium, such as over the electrical wiring or cabling, through fiber optics, or via electromagnetic radiation, wherein, when the computer program code is loaded into and executed by a computer, the computer becomes an apparatus for practicing the invention. When implemented on a general-purpose processor, the computer program code segments configure the processor to create specific logic circuits.

Although the scheme for authentication, dynamic key generation and exchange has been described in terms of exemplary embodiments, it is not limited thereto. Rather, the appended claims should be construed broadly to include other variants and embodiments of the invention which may be made by those skilled in the art without departing from the scope and range of equivalents of the invention.

What is claimed is:

1. A method for generating a security key for a mobile node in communication with an access point of a foreign network, the method comprising:
generating at the mobile node a first authenticator using a group of parameters comprising:
a first random number provided to the mobile node by the access point,
a second random number generated by the mobile node,
a network access identifier of the mobile node,
a predetermined security key shared by the mobile node and the home network of the mobile node,
an identifier of the access point of the foreign network, and
a randomly generated session identifier of a communications session;
providing the first authenticator to a home network of the mobile node;
validating at the mobile node a second authenticator received from the home network via the access point of the foreign network, wherein the second authenticator is generated by the home network upon validating the first authenticator, the first and second authenticators are generated according to a Keyed Message Authorization Code (KMAC) using each of the above listed parameters; and
generating at the mobile node a security key using the predetermined security key and the second authenticator, wherein the security key generated by the mobile node is provided to the access point.

2. The method of claim 1, wherein the second authenticator is generated using the first random number, the second random number, the network access identifier of mobile node, the predetermined security key, the access point identifier of the mobile node, and the session identifier.

3. The method of claim 2, wherein an order of using the first random number, the second random number, the network access identifier, the predetermined security key, the access point identifier, and the session identifier differs between the generation of the second authenticator and the generation of the first authenticator.

4. The method of claim 2, wherein the validating of the second authenticator by the mobile node, comprises:
applying a function, used by the home network to generate the second authenticator, to the first random number, the second random number, the network access identifier, the predetermined security key, the access point identifier, and the session identifier in an order used by the home network in the generating of the second authenticator to calculate an interim second authenticator; and
comparing the second authenticator with the interim second authenticator to determine whether the interim second authenticator matches the second authenticator.

5. The method of claim 1, wherein the security key is an ephemeral security key configured to encrypt and decrypt communications with the mobile node for a current session.

6. The method of claim 1, wherein the security key is an ephemeral security key configured to derive other ephemeral security keys for generating a temporary security association with the mobile node.

7. A method for generating a security key for an access point of a foreign network, the method comprising:
challenging a mobile node to authenticate itself, wherein the mobile node seeks to establish a communications session with a home network of the mobile node via the foreign access point;
providing to the home network a first authenticator received from the mobile node, wherein the first authenticator is generated at the mobile node using a group of parameters comprising:
a first random number provided to the mobile node by the access point;
a second random number generated by the mobile node,
a network access identifier of the mobile node,
a predetermined security key shared by the mobile node and the home network of the mobile node,
an access point identifier of the access point of the foreign network, and
a randomly generated session identifier of the communications session;
providing the first authenticator to a home network of the mobile node;
receiving a second authenticator and the security key from the home network, the second authenticator and the security key generated by the home network upon validating the first authenticator, wherein the second authenticator is generated using the group of parameters and the security key is generated using the predetermined security key and the second authenticator, the first and second authenticators are generated according to a Keyed Message Authorization Code (KMAC) using each of the above listed parameters; and
providing the second authenticator to the mobile node for validating.

8. The method of claim 7, wherein the security key is an ephemeral security key configured to encrypt and decrypt communications between the access point and the mobile node for a current session.

9. The method of claim 7, wherein the security key is an ephemeral security key configured to derive other ephemeral security keys for generating a temporary security association with the access point.

10. The method of claim 7, wherein an order of using parameters of the group of parameters differs between the generation of the second authenticator and the generation of the first authenticator.

11. The method of claim 7, wherein the home network validates the first authenticator by:
calculating an interim first authenticator by applying a function, used by the mobile node to generate the first authenticator, to the parameters of the group of parameters in an order that the mobile node applied the function to the parameters; and
comparing the first authenticator and the interim first authenticator to determine whether the first second authenticator matches the first authenticator.

12. The method of claim 7, wherein the mobile node validates the second authenticator by:
calculating an interim second authenticator by applying a function, used by the home network to generate the second authenticator, to the parameters of the group of parameters in an order that home network applied the function to the parameters; and
comparing the second authenticator with the interim second authenticator to determine whether the interim second authenticator matches the second authenticator.

13. A mobile node for generating a security key, the mobile node comprising:
a mobile node transmitter/receiver portion configured to:
generate a first authenticator, wherein the first authenticator is calculated using a group of parameters comprising:
a first random number provided to the mobile node by an access point of a foreign network,
a second random number generated by the mobile node,
a network access identifier of the mobile node,
a predetermined security key shared by the mobile node and a home network of the mobile node,
an access point identifier of the access point of the foreign network, and
a randomly generated session identifier of a communications session;
provide the first authenticator to the home network of the mobile node via the access point; and
validate a second authenticator received from the home network via the access point of the foreign network, wherein the second authenticator is generated by the home network upon validating the first authenticator, the first and second authenticators are generated according to a Keyed Message Authorization Code (KMAC) using each of the above listed parameters; and
a mobile node key generator configured to generate the security key using the predetermined security key and the second authenticator.

14. A network for generating a security key, the network comprising:
a network transmitter/receiver portion configured to receive from an access point a first authentication, wherein the first authenticator is generated at a mobile node attempting to establish a communications session with the network via the access point;
a network authenticator processor configured to:
validate the received first authenticator using a group of parameters comprising:
a first random number,
a second random number,
a network access identifier of the mobile node, an access point identifier of the access point of the foreign network,
a randomly generated session identifier of the communications session,
a predetermined security key; and
generate, upon the validation of the first authenticator, a second
authenticator using the group of parameters, the first and second authenticators are generated according to a Keyed Message Authorization Code (KMAC) using above listed parameters; and
a network key generator configured to generate the security key using the predetermined security key and the second authenticator, wherein the network transmitter/receiver portion is further configured to provide the security key to the access point and wherein the security key is an ephemeral security key configured for encrypting and decrypting communications between the mobile node and the access point during the communications session.

15. The network of claim 14, wherein said security key is an ephemeral security key configured to derive other ephemeral security keys for generating a temporary security association with the mobile node.

16. A method generating a security key by a network, the method comprising:
receiving, from an access point, a first authenticator, wherein the first authenticator is generated at a mobile node attempting to establish a communications session with the network via the access point;
validating the received first authenticator using a group of parameters comprising:
a first random number,
a second random number,
a network access identifier of the mobile node,
a predetermined security key,
an access point identifier of the access point of the foreign network,
a randomly generated session identifier of the communications session, and
a predetermined security key;
generating, upon successful validation of the first authenticator, a second authenticator using the group of parameters, the first and second authenticators are generated according to a Keyed Message Authorization Code (KMAC) using each of the above listed parameters;
generating the security key using the predetermined security key and the second authenticator, if said second authenticator matches said interim second authenticator; and
providing the security key to the access point, wherein the security key is configured to be used for encrypting and decrypting communications between the mobile node and the access point during the communications session upon the second authenticator being validated by the mobile node.

17. The method of claim 16, wherein the security key is an ephemeral security key configured to derive other ephemeral security keys for generating a temporary security association between the mobile node and the network.

18. A computer non-transitory readable storage medium encoded with a computer program code, wherein when the computer program code is executed by a processor, the processor performs a method for generating a security key for a mobile node, the method comprising:
providing a first authenticator to a home network of the mobile node via an access point of the foreign network, wherein the first authenticator is generated at the mobile node using a group of parameters comprising:
a first random number provided to the mobile node by the access point,
a second random number generated by the mobile node,
a network access identifier of mobile node,
an access point identifier of the of the foreign network,
a randomly generated session identifier of the communications session, and
a predetermined security key shared by the mobile node and the home network of the mobile node
validating at the mobile node
a second authenticator received from the home network via the access point of the foreign network, wherein the second authenticator is generated by the home network upon validating the first second authenticator, the first and second authenticators are generated according to a Keyed Message Authorization Code (KMAC) using each of the above listed parameters; and
generating at the mobile node the security key using the predetermined security key and the second authenticator, wherein the security key generated by the home network is provided to the access point.

19. A computer non-transitory readable storage medium encoded with a computer program code, wherein when the computer program code is executed by a processor, the processor performs a method for generating a security key for an access point, the method comprising:
challenging a mobile node to authenticate itself, wherein the mobile nodes seeks to establish a communications session with a home network of the mobile node via the access point of a foreign network;
providing to the home network a first authenticator received from the mobile node, wherein the first authenticator is generated at the mobile node using a group of parameters comprising:
a first random number provided to the mobile node by the access point;
a second random number generated by the mobile node,
a network access identifier of the foreign network,
a predetermined security key shared by the mobile node and the home network of the mobile node,
an access point identifier of the access point, and
a randomly generated session identifier of the communications session;
receiving a second authenticator and the security key from the home network, the second authenticator and the security key generated by the home network upon validating the first authenticator, wherein the second authenticator is generated using the group of parameters, an order of using the parameters of the group of parameters being different between the generation of the second authenticator and the generation of the first authenticator and wherein the security key is generated using the predetermined security key and the second authenticator, the first and second authenticators are generated according to a Keyed Message Authorization Code (KMAC) using each of the above listed parameters; and
providing the second authenticator to the mobile node for validating.

20. A computer non-transitory readable storage medium encoded with a computer program code, wherein when the computer program code is executed by a processor, the processor performs a method for generating a security key by a network, the method comprising:
receiving, from an access point, a first authenticator, wherein the first authenticator is generated at a mobile node attempting to establish a communications session with the network via the access point;

validating the received first authenticator using a group of parameters comprising: a first random number, a second random number, a network access identifier of the mobile node, a predetermined security key, an access point identifier of the access point, and a randomly generated session identifier of the communications session;

generating, upon successful validation of the first authenticator, a second authenticator using the group of parameters, wherein an order of using the parameters of the group of parameters differs between the generation of the second authenticator and the generation of the first authenticator;

generating the security key using the predetermined security key and the second authenticator, if said second authenticator matches said interim second authenticator, the first and second authenticators are generated according to a Keyed Message Authorization Code (KMAC) using each of the above listed parameters; and providing the security key to the access point, wherein the security key is configured to be used for encrypting and decrypting communications between the mobile node and the access point during the communications session upon the second authenticator being validated by the mobile node.

* * * * *